US011016560B1

(12) United States Patent
Wenger et al.

(10) Patent No.: US 11,016,560 B1
(45) Date of Patent: May 25, 2021

(54) VIDEO TIMEWARP FOR MIXED REALITY AND CLOUD RENDERING APPLICATIONS

(71) Applicant: Rockwell Collins, Inc., Cedar Rapids, IA (US)

(72) Inventors: Jason C. Wenger, Cedar Rapids, IA (US); Peter R. Bellows, Marion, IA (US); Danilo P. Groppa, Pasadena, CA (US); Jeanette M. Ling, Park City, UT (US); Richard M. Rademaker, Cedar Rapids, IA (US)

(73) Assignee: Rockwell Collins, Inc., Cedar Rapids, IA (US)

(\*) Notice: Subject to any disclaimer, the term of this patent is extended or adjusted under 35 U.S.C. 154(b) by 0 days.

(21) Appl. No.: 16/378,133

(22) Filed: Apr. 8, 2019

(51) Int. Cl.
| | |
|---|---|
| *H04N 13/00* | (2018.01) |
| *G06F 3/00* | (2006.01) |
| *G06T 3/60* | (2006.01) |
| *G06T 5/00* | (2006.01) |
| *G06F 3/01* | (2006.01) |
| *H04N 13/332* | (2018.01) |
| *H04N 13/239* | (2018.01) |
| *H04N 13/156* | (2018.01) |
| *H04N 13/361* | (2018.01) |
| *H04N 13/366* | (2018.01) |

(52) U.S. Cl.
CPC .......... *G06F 3/012* (2013.01); *G06T 3/60* (2013.01); *G06T 5/006* (2013.01); *H04N 13/156* (2018.05); *H04N 13/239* (2018.05); *H04N 13/332* (2018.05); *H04N 13/361* (2018.05); *G06T 2207/10021* (2013.01); *H04N 13/366* (2018.05)

(58) Field of Classification Search
None
See application file for complete search history.

(56) References Cited

U.S. PATENT DOCUMENTS

| | | | | |
|---|---|---|---|---|
| 9,332,285 | B1* | 5/2016 | Grant | G06T 19/003 |
| 10,152,775 | B1* | 12/2018 | Bellows | G02B 27/0172 |
| 10,510,137 | B1* | 12/2019 | Kitain | G06T 3/40 |
| 2017/0345220 | A1* | 11/2017 | Bates | G06T 19/20 |
| 2019/0080517 | A1* | 3/2019 | You | G06T 19/006 |

\* cited by examiner

*Primary Examiner* — Edemio Navas, Jr.
(74) *Attorney, Agent, or Firm* — Suiter Swantz pc llo

(57) ABSTRACT

A mixed reality (MR) system is disclosed. The MR system may determine a first predicted head pose corresponding to a time that virtual reality imagery is rendered, determine a second predicted head pose corresponding to a selected point in time during a camera shutter period, and combine the virtual reality imagery with the stereoscopic imagery based on the first predicted head pose and the second predicted head pose. A simulator that employs remote (e.g., cloud) rendering is also disclosed. The simulator/client device may determine a first pose (e.g., vehicle pose and/or head pose), receive video imagery rendered by a remote server based on the first pose, and apply a timewarp correction to the video imagery based on a comparison of the first pose and a second pose.

14 Claims, 9 Drawing Sheets

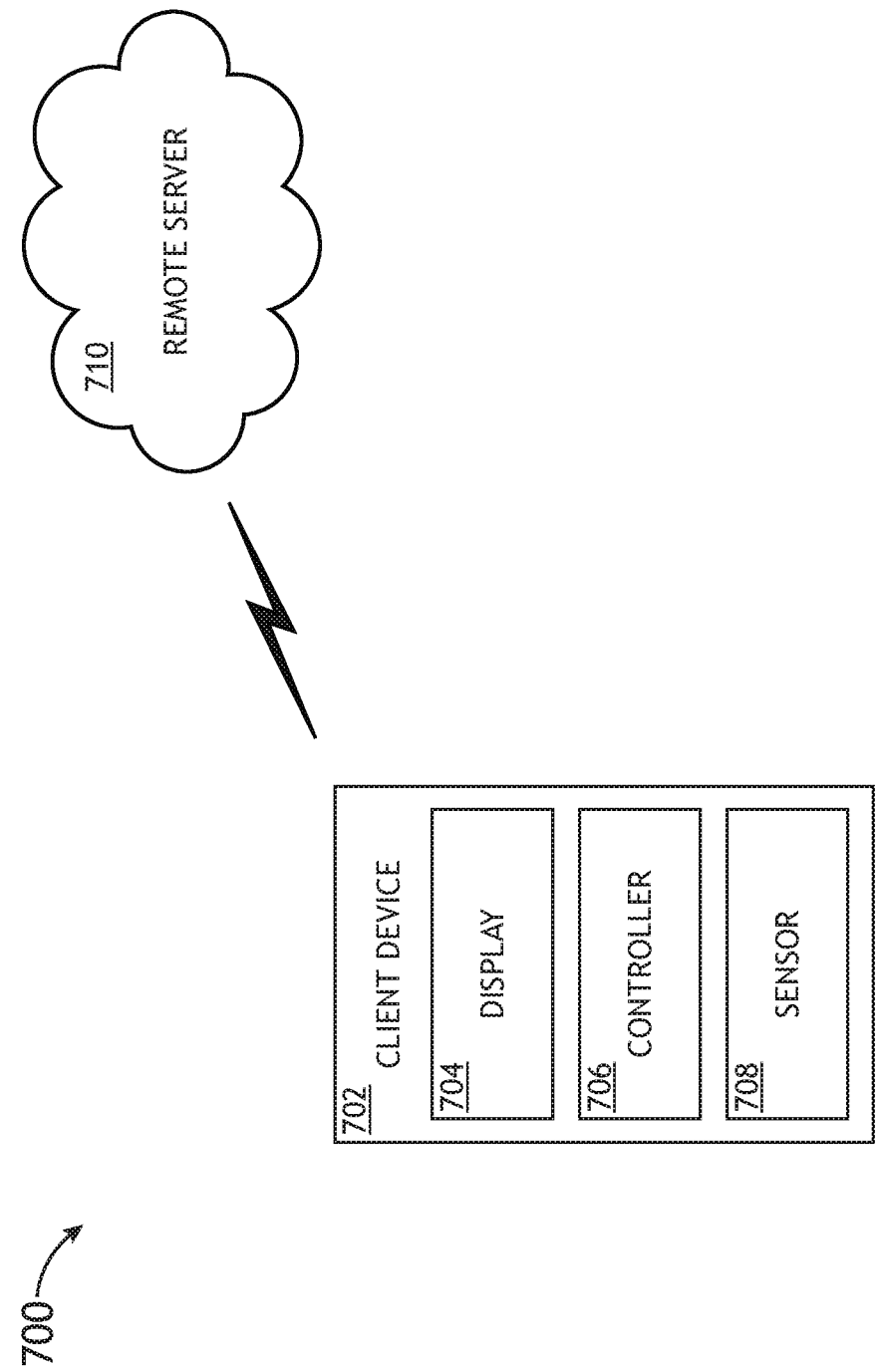

VIDEO TIMEWARP FOR MIXED REALITY AND CLOUD RENDERING APPLICATIONS

BACKGROUND

Mixed reality (MR) is a rapidly-developing display technology for training and simulation markets, with uniquely demanding computer vision performance requirements. MR often uses a virtual reality (VR) head-worn display, with a fully occluded and/or fully digital display; however, head-mounted cameras are also used to bring in first-person, live views of real people and objects from the real world around the user. The live and virtual elements are selectively blended, on-the-fly, to generate a single blended, immersive scene to the user, with better engagement and retention of training content than pure virtual reality alone.

The algorithms involved in MR processing are computationally intensive due to the high frame rate (e.g., 90 Hz+) and/or high resolution required for the head-mounted display (HMD) not to cause motion sickness. They are heavily pipelined to maintain throughput. As a result, the scene that is rendered is out of date by the time it is displayed to the user, because it takes multiple frame times between when the latest head pose is received from the motion tracker to when the scene rendered for that specific head pose reaches the display.

Some simulators employ cloud rendering, a technique where computationally expensive 3D rendering applications are performed on servers, and the resulting video is streamed to the client application for display. A key problem with cloud rendering is latency. Enough information to describe what is needed to render the desired image must be sent from the client to the server, the image must be rendered, then the rendered image must be compressed, typically using MPEG compression algorithms. The compressed image must be sent back over the network to the client, and the received video stream must be decoded back into an image for display. Each of these steps adds latency. For applications such as flight simulators, latency of the visual system is a critical measure of performance.

SUMMARY

A mixed reality (MR) system is disclosed. In embodiments, the MR system includes a head mounted device including a display and a stereoscopic camera system. The MR system further includes one or more controllers communicatively coupled to the head mounted device. The one or more controllers may be configured to determine a first predicted head pose corresponding to a time that virtual reality imagery is rendered by the one or more controllers. The one or more controllers may be further configured to determine a second predicted head pose corresponding to a selected point in time during a camera shutter period for detecting stereoscopic imagery via the stereoscopic camera system. The one or more controllers may be further configured to combine the virtual reality imagery with the stereoscopic imagery at least in part by positioning a selected portion of the stereoscopic imagery relative to a selected portion of the virtual reality imagery based on the first predicted head pose and the second predicted head pose.

A system that employs remote (e.g., cloud) rendering for a simulator is also disclosed. In embodiments, the system includes a remote (e.g., cloud) server and a simulator/client device in communication with the remote server. The simulator/client device may include at one display and at least one controller. The controller may be configured to determine a first pose (e.g., vehicle pose and/or head pose) and transmit the first pose to the remote server. The controller may be further configured to receive video imagery rendered by the remote server. The controller may be further configured to determine a second pose (e.g., vehicle pose and/or head pose). The controller may be further configured to compare the first pose to the second pose. The controller may be further configured to apply a timewarp correction to the video imagery based on the comparison of the first pose to the second pose.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 7 illustrates a system that employs remote (e.g., cloud) rending for a simulator, in accordance with one or more embodiments of this disclosure.

DETAILED DESCRIPTION

Figure 1A:
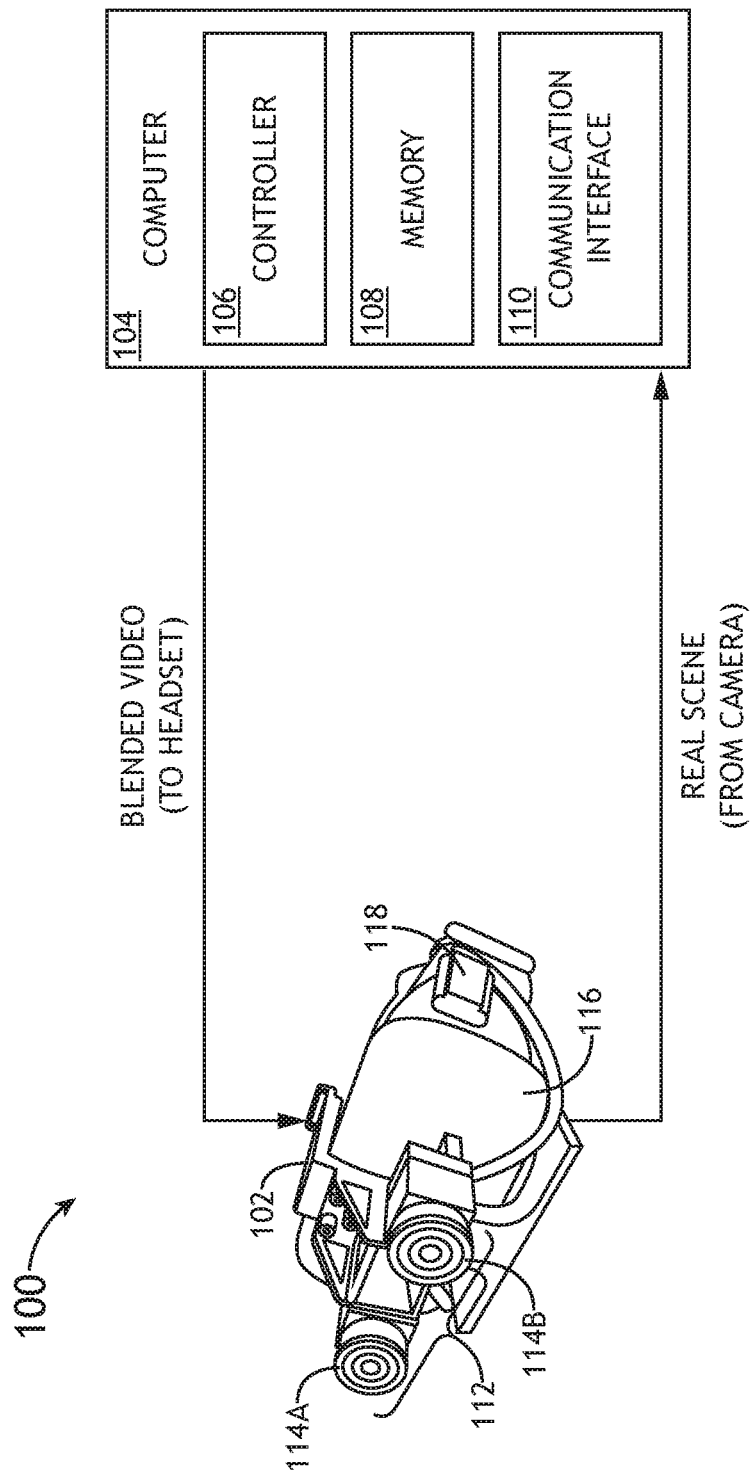
FIG. 1A is a schematic illustration of a mixed reality system, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Figure 1B:
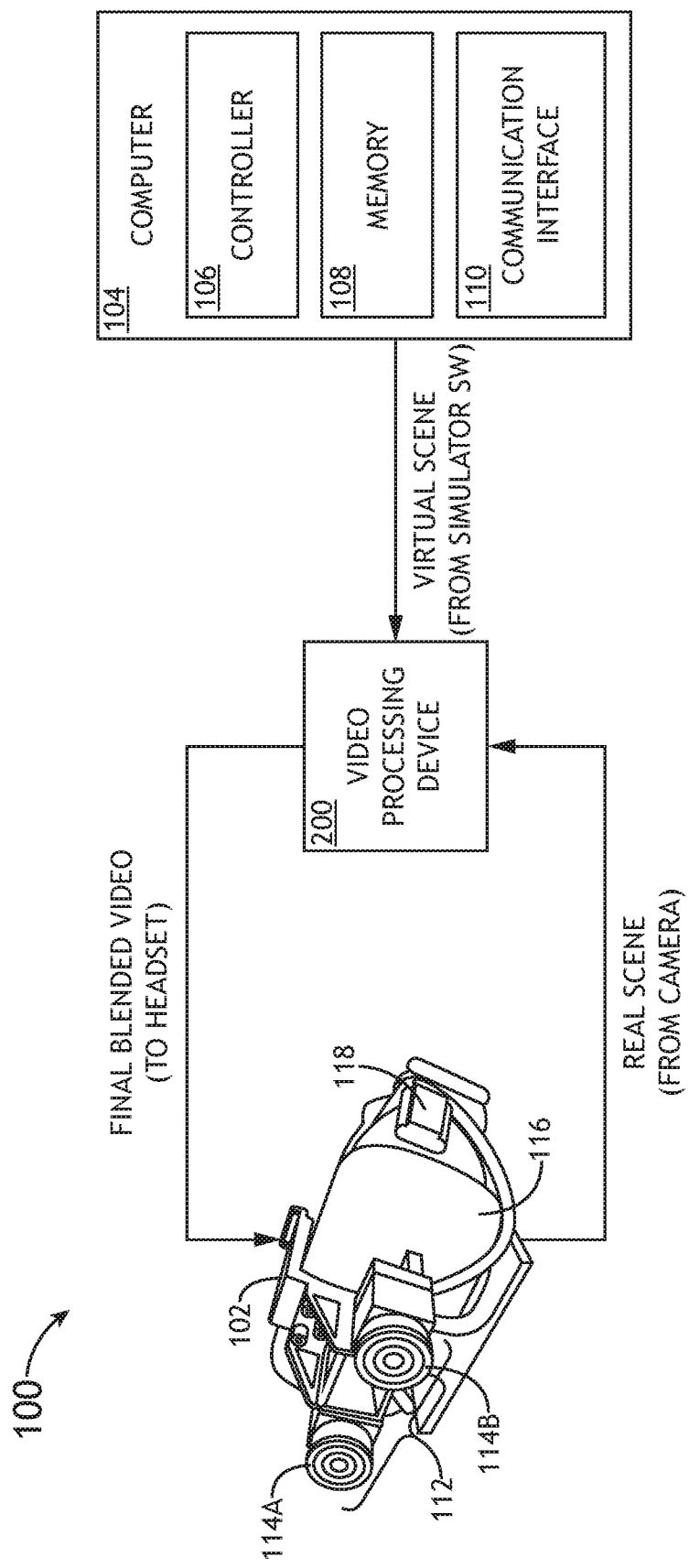
FIG. 1B is a schematic illustration of the mixed reality system, including a video processing device, in accordance with one or more embodiments of this disclosure.

FIGS. 1A and 1B illustrate embodiments of a mixed reality (MR) system 100 that employs timewarp techniques. As previously noted herein, the algorithms involved in MR processing are computationally intensive due to the high frame rate (e.g., 90 Hz+) and/or high resolution required for the head-mounted display (HMD) not to cause motion sickness. They are heavily pipelined to maintain throughput. As a result, the scene that is rendered is out of date by the time it is displayed to the user, because it takes multiple frame times between when the latest head pose is received from the motion tracker to when the scene rendered for that specific head pose reaches the display.

Figure 3:
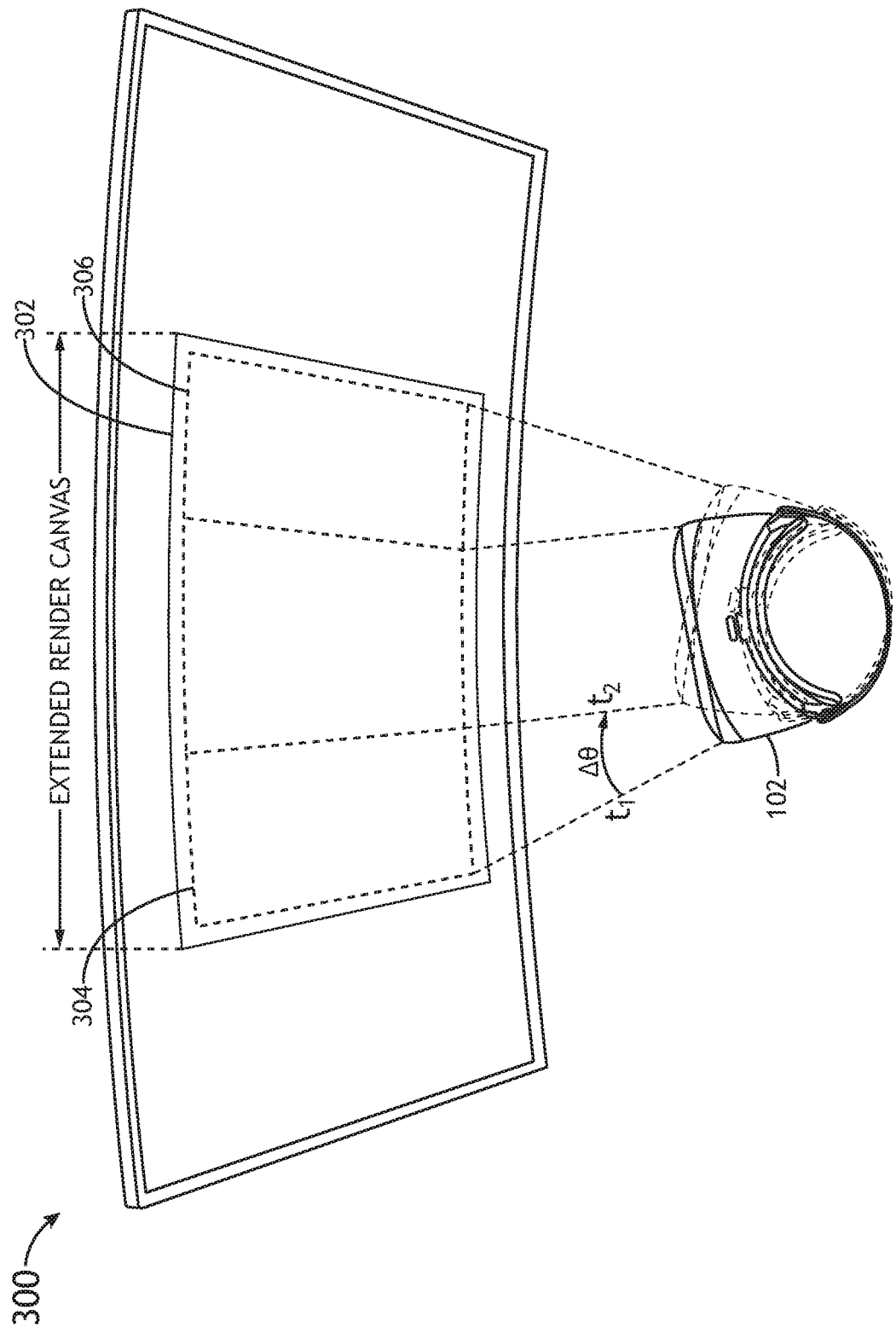
FIG. 3 schematically illustrates a timewarp function for the mixed reality system, in accordance with one or more embodiments of this disclosure.

One approach to this problem that has been adopted in the VR domain is known as "Asynchronous Timewarp", or "Asynchronous Reprojection". Timewarp seeks to mitigate some of the lag by over-rendering the scene, with a wider viewport than can be displayed in a headset 102 (e.g., image 302). For example, as shown in FIG. 3, the system may render the next frame (e.g., image 304) using the latest head pose (e.g., head position and/or orientation at time $t_1$). By the time rendering has completed and the system is ready to display the new frame (at time $t_2$) the head may have moved to a new position. The system performs a just-in-time 2-D transform to the rendered scene (e.g., a simple shift and/or rotation) and then crops the scene down to the actual viewport size of the display (e.g., image 306). This is an approximation; the 2-D transform is quick to compute, but does not exactly match the view/perspective the 3-D renderer would have generated for the same head pose. Nevertheless, under the blur of motion, the effect is close enough to be convincing; and most of the rendering latency has been hidden.

These latency-hiding techniques have unique applications and challenges when applied to a MR system, rather than just conventional VR. Timewarp techniques can be applied to both the real (camera) and virtual processing pipelines. But the two pipelines are processed somewhat asynchronously; the camera shutter time may vary depending on autoexposure settings, and the start of virtual rendering will vary based on CPU/GPU loading. This means that the two images will require different warps. The warp for the camera image gets even more complicated if the camera is using a rolling shutter, where the shutter for each row of the image is staggered, for the absolute minimum latency in camera output; in this case, the timewarp would literally be unique for each row of the image if the head was moving.

FIG. 1A illustrates an embodiment of a MR system 100. In embodiments, the MR system 100 includes a computer system 104 configured to generate VR imagery (e.g., virtual images and/or video stream) and a head mounted device 102 communicatively coupled to the computer system 104. The head mounted device 102 may include a head-worn display 116 (e.g., LCD, LED display, OLED display, or the like). In some embodiments, the periphery of the display 116 may be occluded so that light cannot enter from the periphery of the display 116 when the head mounted device 102 is worn by a user. The head mounted device 102 further includes a stereoscopic camera system 112, which may include a first camera/sensor 114A and a second camera/sensor 114B configured to detect stereo imagery. The first camera/sensor 114A and the second camera/sensor 114B may be configured to detect respective video streams that are then combined to generate the stereo imagery (e.g., a stereo video stream or series of stereo images). The MR system 100 may further include at least one sensor 118 for detecting head pose (e.g., head position and/or orientation). In embodiments, the sensor (or sensors) 118 may include an accelerometer, a gyroscope, an inertial measurement unit (IMU), any combination thereof, or the like. In some embodiments, the sensor (or sensors) 118 may include one or more optical sensors and/or radio frequency (RF) sensors configured to detect head position and/or orientation based on signals received from a plurality of light or RF sources (e.g., based upon a triangulation scheme). The sensor (or sensors) 118 may be coupled to or integrated within the head mounted device 102. Alternatively or additionally, one or more sensors 118 may be configured to track the head mounted device 102 from a fixed location (e.g., within a room or any other environment).

In embodiments, the computer system 104 includes a controller 106, memory 108, and a communication interface 110. The controller 106 provides processing functionality for at least the computer system 104 and can include any number of processors, micro-controllers, circuitry, field programmable gate array (FPGA) or other processing systems, and resident or external memory for storing data, executable code, and other information accessed or generated by the computer system 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

The memory 108 can be an example of tangible, computer-readable storage medium that provides storage functionality to store various data and/or program code associated with operation of the computer system 104/controller 106, such as software programs and/or code segments, or other data to instruct the controller 106, and possibly other components of the computer system 104, to perform the functionality described herein. Thus, the memory 108 can store data, such as a program of instructions for operating the computer system 104, including its components (e.g., controller 106, communication interface 110, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 110 can be operatively configured to communicate with components of the computer system 104. For example, the communication interface 110 can be configured to retrieve data from the controller 106 or other devices (e.g., head mounted device 102, etc.), transmit data for storage in the memory 108, retrieve data from storage in the memory 108, and so forth. The communication interface 110 can also be communicatively coupled with the controller 106 to facilitate data transfer between components of the computer system 104 and the controller 106. It should be noted that while the communication interface 110 is described as a component of the computer system 104, one or more components of the communication interface 110 can be implemented as external components communicatively coupled to the computer system 104 via a wired and/or wireless connection. The computer system 104 can also include and/or connect to one or more devices (e.g., via the communication interface 110), such as display 116, one or more sensors (e.g., stereoscopic camera system 112, sensor 118, etc.), or any other input/output (I/O) device (e.g., computer display(s), speaker(s), a mouse, a trackball, a trackpad, a joystick, a VR controller, a touchpad, a touchscreen, a keyboard, a keypad, a microphone (e.g., for voice commands), or the like). In embodiments, the communication interface 110 includes or is coupled to a transmitter, receiver, transceiver, physical connection interface, or any combination thereof.

In embodiments, the computer system 104/controller 106 is configured to render VR imagery (e.g., a virtual image, sequence of virtual images, virtual video stream, or the like). The computer system 104/controller 106 can also be configured to determine a first predicted head pose corresponding to a time that VR imagery is rendered. In some embodiments, the first predicted head pose is detected by sensor 118. For example, the computer system 104/controller 106 may be configured to receive a head pose detected prior to, at the start of, during, at the end of, or after rendering the VR imagery. In other embodiments, the first predicted head pose is based on one or more head poses detected by the sensor 118. For example, the computer system 104/controller 106 may be configured to predict a head pose at a selected time based on a current head pose and an anticipated head movement. The first predicted head pose can also be calculated based on a plurality of detected head poses over time. For example, the computer system 104/controller 106 may be configured to predict a head pose at a selected time based on a number of previously detected head poses over time (e.g., based on a number of head pose measurements indicating a head movement and/or rotation and speed of the head movement and/or rotation).

The computer system 104/controller 106 may be configured to combine the VR imagery with stereoscopic imagery (e.g., images, video footage, etc.) captured by the stereoscopic camera system 112. In such cases, the computer system 104/controller 106 may be configured to determine a second predicted head pose corresponding to a selected point in time during a camera shutter period for detecting the stereoscopic imagery via the stereoscopic camera system 112. For example, prior to, at the start of, or during the camera capture, the computer system 104/controller 106 may be configured to predict the head pose (e.g., the head position and/or orientation) at the middle/center of the camera shutter period or at any other selected time during the camera shutter period. In some embodiments, the second predicted head pose is detected by sensor 118. For example, the computer system 104/controller 106 may be configured to receive a head pose detected prior to, at the start of, or during the camera shutter period. In other embodiments, the second predicted head pose is based on one or more head poses detected by the sensor 118. For example, the computer system 104/controller 106 may be configured to predict a head pose at a selected time based on a current head pose and an anticipated head movement. In some embodiments, the computer system 104/controller 106 may be configured to determine the second predicted head pose based on a detected head position and orientation at a selected point in time during the camera shutter period (e.g., start of the camera shutter period) and a time difference between the selected point in time during the camera shutter period (e.g., start of the camera shutter period) and the center of the camera shutter period. The second predicted head pose can also be calculated based on a plurality of detected head poses over time. For example, the computer system 104/controller 106 may be configured to predict a head pose at a selected time based on a number of previously detected head poses over time (e.g., based on a number of head pose measurements indicating a head movement and/or rotation and speed of the head movement and/or rotation).

As described above, the computer system 104/controller 106 may be configured to determine a first predicted head pose associated with rendering the VR imagery and a second predicted head pose associated with detecting the stereoscopic (camera) imagery. The computer system 104/controller 106 may be further configured to combine the VR imagery with the stereoscopic imagery by positioning a selected portion of the stereoscopic imagery relative to a selected portion of the VR imagery based on the first predicted head pose and the second predicted head pose. For example, after camera capture is complete, the computer system 104/controller 106 can be configured to position camera captured imagery at the correct place in the VR rendered imagery based on the head orientation information. In an example scenario, if the user's head is yawing left to right, a stereoscopic (camera) image would be placed further left in a combined image, reflecting the fact that if the cameras capture an image of an object directly in front of the head at time of image capture, by the time the image is presented to the user, the user's head will now be looking further right, leaving the object to the left side of the user.

In embodiments, the computer system 104/controller 106 may be configured to associate the second predicted head pose with the stereoscopic imagery detected by the stereoscopic camera system 112. The computer system 104/controller 106 can then compare the first predicted head pose and the second predicted head pose. For example, the computer system 104/controller 106 may be configured to determine a difference between the first predicted head pose and the second predicted head pose. After performing said comparison, the computer system 104/controller 106 may be configured to apply a timewarp correction to the stereoscopic imagery and/or the VR imagery based on the comparison of the first predicted head pose and the second predicted head pose. For example, the computer system 104/controller 106 can be configured to shift and/or rotate a selected portion (e.g., all or some) of the stereoscopic imagery and/or a selected portion (e.g., all or some) of the VR imagery based on the difference between the first predicted head pose and the second predicted head pose. In some embodiments, the computer system 104/controller 106 may be configured to re-project the stereoscopic imagery into the coordinates of the VR imagery, shifted and/or rotated, based on the first predicted head pose and the second predicted head pose.

After and/or in parallel with performance of the timewarp correction, the computer system 104/controller 106 may be configured to merge/combine the stereoscopic imagery and the VR imagery together, resulting in MR imagery. In some embodiments, the computer system 104/controller 106 is configured to perform additional processing on the MR imagery. For example, the computer system 104/controller 106 may be configured to apply a distortion correction to the MR imagery. In this regard, after the timewarp correction is applied and the stereoscopic imagery is combined with the VR imagery, the computer system 104/controller 106 may treat the combined MR imagery in substantially the same manner that the computer system 104/controller 106 would treat VR imagery.

In embodiments, the computer system 104/controller 106 may be configured to perform three separate distortions. In all three cases, the distortions may involve projection of a 3D space onto a 2D image plane.

First, the camera and lens optics may apply a well characterized projection of 2D angle (azimuth/elevation) to 2D x-y coordinates in the captured image. Different lenses and focus combinations may apply different projections. If the system employs lenses that are adjustable/automatic for focus and/or zoom, then the lens projections may change from frame to frame and the system may accordingly use a different distortion table based on circumstances. With good lenses, chromatic aberration may be negligible, but a system that uses lenses with a lot of aberration may employ distinct Red/Green/Blue projections to account for aberration.

Second, the VR rendering process may apply a projection when it draws the 3D scene. For example, this may be the standard computer graphics frustum projection, but systems that use other (nonlinear) projections are also contemplated.

Third, the head mounted device (HMD) application programming interface (API) may apply a projection from the rendered VR 2D image plane to another 2D image plane that is sent to the HMD display. This is usually a pair of projections that happen together inside the HMD API, however there are systems where they can be separated and one or both components of this could be done by the VR renderer instead.

In embodiments, the first distortion is standard timewarp, in its normal usage as is done by the VR API to account for motion between render and image presentation. The second is a distortion that is the inverse of the distortion caused by the optics in the HMD headset, such that the distorted image that is presented on the HMD screens gets 'undistorted' as it passes through the optics and the result looks normal. This optical distortion is usually a set of three different distortions—R, G, and B pixels are each distorted differently to correct out the chromatic aberration introduced by the HMD headset's optics.

The key to MR is that in order to combine two images, they must have the same projection and the same positional reference. Thus, if the merge is done before the third projection, then the distortion applied to the captured camera image must: correct out the camera's projection; timewarp the video to correct render-to-capture motion; introduce the frustum projection; and merge the two images. By contrast, if the merge is done after the third projection (e.g., in a system like the system illustrated in FIG. 1B where merge happens in an external box (e.g., video processing device 200)) the captured camera image must: correct out the camera's projection; timewarp the video to correct capture-to-presentation motion; introduce the frustum and chromic projection; and merge the two images. In embodiments, some of the operations may be reordered or combined.

FIG. 1B illustrates another embodiment of the MR system 100, where the MR system 100 further includes a video processing device 200 communicatively coupled to the computer system 104 and the head mounted device 102. In some embodiments, the video processing device 200 may include hardware (e.g., circuitry, one or more integrated circuits (ICs), one or more programmable controllers/devices, etc.), software (program modules, control logic, etc.), and/or firmware that is coupled to (e.g., physically attached to) or integrated within (e.g., at least partially embedded in) the head mounted device 102. In other embodiments, the video processing device 200 is instead coupled to or integrated within the computer system 104. In other embodiments, some portions of the video processing device/system 200 are coupled to or integrated within the head mounted device 102 and some portions of the video processing device/system 200 are coupled to or integrated within the computer system 104.

One challenge the disclosed MR system 100 may address is performance, particularly for embedded devices. For example, all mixed reality processing may occur in a small FPGA device, that does not use frame buffers, in order to reduce latency. A computationally-efficient implementation for timewarp is required for such devices.

The disclosed MR system 100 may leverage existing motion-tracking of commercial off-the-shelf (COTS) VR platforms to generate a synchronized warping function for both the synthetic (VR) and real (camera) scenes, without requiring modification to the existing COTS infrastructure. The MR system 100 may employ a lightweight distortion correction function to perform timewarp in a resource-efficient manner, well-suited to embedded devices like FPGAs. Some features of the MR system include, but are not limited to the following.

In some embodiments, the MR system 100 achieves synchronized warping of synthetic (VR) and camera views, to ensure that the assembled MR frame represents a single head pose as close as possible to the moment of display. This may occur despite the fact that synthetic frame rendering and camera exposure are asynchronous to each other.

The MR system 100 may be configured with a resource-efficient implementation of the timewarp function using a streaming distortion corrector, such that adding the timewarp function requires minimal increase in logic resources, and only a modest increase in RAM.

The MR system 100 may rely on a decomposition of all relevant timewarp operations into a combination of X- and Y-axis translations and a finite set of pre-loaded distortion tables for rotational/skew types of timewarp.

The MR system 100 may maintain synchronization between camera and synthetic timewarps, even when auto-exposure is enabled in the cameras. The MR system 100 may also employ variable timewarp to correct out lateral motion or tearing when a rolling shutter is used in the cameras.

The MR system 100 be configured with bolt-on architecture, such that timewarp-synchronized mixed reality can be implemented on COTS VR devices without modification of the COTS hardware or software. For example, the video processing device 200 of the MR system 100 may be configured to connect with the head mounted device 102 and the computer system 104 via a standard connection interface (e.g., HDMI, USB, USB-C, DisplayPort, Thunderbolt, or the like).

Figure 2:
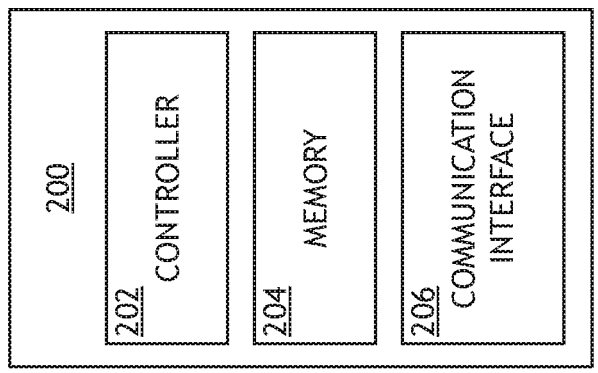
FIG. 2 is a block diagram illustrating components of the video processing device, in accordance with one or more embodiments of this disclosure.

As shown in FIG. 2, the video processing device 200 may include a controller 202, memory 204, and a communication interface 206. The controller 202 provides processing functionality for at least the video processing device 200 and can include any number of processors, micro-controllers, circuitry, field programmable gate array (FPGA) or other processing systems, and resident or external memory for storing data, executable code, and other information accessed or generated by the video processing device 200. The controller 202 can execute one or more software programs embodied in a non-transitory computer readable medium (e.g., memory 204) that implement techniques described herein. The controller 202 is not limited by the materials from which it is formed or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the video processing device 200/controller 202, such as software programs and/or code segments, or other data to instruct the controller 202, and possibly other components of the video processing device 200, to perform the functionality described herein. Thus, the memory 204 can store data, such as a program of instructions for operating the video processing device 200, including its components (e.g., controller 202, communication interface 206, etc.), and so forth. It should be noted that while a single memory 204 is described, a wide variety of types and combinations of memory (e.g., tangible, non-transitory memory) can be employed. The memory 204 can be integral with the controller 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the video processing device 200. For example, the communication interface 206 can be configured to retrieve data from the controller 202 or other devices (e.g., head mounted device 102, computer system 104, etc.), transmit data for storage in the memory 204, retrieve data from storage in the memory 204, and so forth. The communication interface 206 can also be communicatively coupled with the controller 202 to facilitate data transfer between components of the video processing device 200 and the controller 202. It should be noted that while the communication interface 206 is described as a component of the video processing device 200, one or more components of the communication interface 206 can be implemented as external components communicatively coupled to the video processing device 200 via a wired and/or wireless connection. The video processing device 200 can also include and/or connect to one or more devices (e.g., via the communication interface 206), such as computer system 104, display 116, one or more sensors (e.g., stereoscopic camera system 112, sensor 118, etc.), or any other I/O device. In embodiments, the communication interface 206 includes or is coupled to a transmitter, receiver, transceiver, physical connection interface, or any combination thereof.

As previously described with reference to FIG. 1A, in embodiments illustrated by FIG. 1B, the computer system 104/controller 106 is configured to render VR imagery (e.g., a virtual image, sequence of virtual images, virtual video stream, or the like). The computer system 104/controller 106 can also be configured to determine a first predicted head pose corresponding to a time that VR imagery is rendered. In some embodiments, the first predicted head pose is detected by sensor 118. For example, the computer system 104/controller 106 may be configured to receive a head pose detected prior to, at the start of, during, at the end of, or after rendering the VR imagery. In other embodiments, the first predicted head pose is based on one or more head poses detected by the sensor 118. For example, the computer system 104/controller 106 may be configured to predict a head pose at a selected time based on a current head pose and an anticipated head movement. The first predicted head pose can also be calculated based on a plurality of detected head poses over time. For example, the computer system 104/controller 106 may be configured to predict a head pose at a selected time based on a number of previously detected head poses over time (e.g., based on a number of head pose measurements indicating a head movement and/or rotation and speed of the head movement and/or rotation).

The video processing device 200/controller 202 may be configured to receive the VR imagery and the first predicted head pose from the computer system 104/controller 106. The video processing device 200/controller 202 may be further configured to combine the VR imagery with stereoscopic imagery (e.g., images, video footage, etc.) captured by the stereoscopic camera system 112. In such cases, the video processing device 200/controller 202 may be configured to determine a second predicted head pose corresponding to a selected point in time during a camera shutter period for detecting the stereoscopic imagery via the stereoscopic camera system 112. For example, prior to, at the start of, or during the camera capture, the video processing device 200/controller 202 may be configured to predict the head pose (e.g., the head position and/or orientation) at the middle/center of the camera shutter period or at any other selected time during the camera shutter period. In some embodiments, the second predicted head pose is detected by sensor 118. For example, the video processing device 200/controller 202 may be configured to receive a head pose detected prior to, at the start of, or during the camera shutter period. In other embodiments, the second predicted head pose is based on one or more head poses detected by the sensor 118. For example, the video processing device 200/controller 202 may be configured to predict a head pose at a selected time based on a current head pose and an anticipated head movement. In some embodiments, the video processing device 200/controller 202 may be configured to determine the second predicted head pose based on a detected head position and orientation at a selected point in time during the camera shutter period (e.g., start of the camera shutter period) and a time difference between the selected point in time during the camera shutter period (e.g., start of the camera shutter period) and the center of the camera shutter period. The second predicted head pose can also be calculated based on a plurality of detected head poses over time. For example, the video processing device 200/controller 202 may be configured to predict a head pose at a selected time based on a number of previously detected head poses over time (e.g., based on a number of head pose measurements indicating a head movement and/or rotation and speed of the head movement and/or rotation). In other embodiments, the video processing device 200/controller 202 may be configured to receive a first pose from the simulator, tag the commands to a cloud rendering device with a frame number, send the commands, then (later) receive the rendered image, and use the frame tag to look up the first pose, based on having maintained a history of recently sent poses (e.g., indexed by frame number).

The video processing device 200/controller 202 may be further configured to combine the VR imagery with the stereoscopic imagery by positioning a selected portion of the stereoscopic imagery relative to a selected portion of the VR imagery based on the first predicted head pose and the second predicted head pose. For example, after camera capture is complete, the video processing device 200/controller 202 can be configured to position camera captured imagery at the correct place in the VR rendered imagery based on the head orientation information. In an example scenario, if the user's head is yawing left to right, a stereoscopic (camera) image would be placed further left in a combined image, reflecting the fact that if the cameras capture an image of an object directly in front of the head at time of image capture, by the time the image is presented to the user, the user's head will now be looking further right, leaving the object to the left side of the user.

In embodiments, the video processing device 200/controller 202 may be configured to associate the second predicted head pose with the stereoscopic imagery detected by the stereoscopic camera system 112. The video processing device 200/controller 202 can then compare the first predicted head pose and the second predicted head pose. For example, the video processing device 200/controller 202 may be configured to determine a difference between the first predicted head pose and the second predicted head pose. After performing said comparison, the video processing device 200/controller 202 may be configured to apply a timewarp correction to the stereoscopic imagery and/or the VR imagery based on the comparison of the first predicted head pose and the second predicted head pose. For example, the video processing device 200/controller 202 can be configured to shift and/or rotate a selected portion (e.g., all or some) of the stereoscopic imagery and/or a selected portion (e.g., all or some) of the VR imagery based on the difference between the first predicted head pose and the second predicted head pose. In some embodiments, the video processing device 200/controller 202 may be configured to re-project the stereoscopic imagery into the coordinates of the VR imagery, shifted and/or rotated, based on the first predicted head pose and the second predicted head pose.

After and/or in parallel with performance of the timewarp correction, the video processing device 200/controller 202 may be configured to merge/combine the stereoscopic imagery and the VR imagery together, resulting in MR imagery. In some embodiments, the video processing device 200/controller 202 is configured to perform additional processing on the MR imagery. For example, the video processing device 200/controller 202 may be configured to apply a distortion correction to the MR imagery.

In embodiments, the video processing device 200/controller 202 may be configured to perform three separate distortions (e.g., as described above with regard to the computer system 104/controller 106). For example, the video processing device 200/controller 202 may be configured to correct out the camera's projection, timewarp the video to correct capture-to-presentation motion, introduce the frustum and chromic projection, before merging the two images. In embodiments, some of the operations may be reordered or combined.

In other embodiments, video processing device 200/controller 202 is further configured to apply a distortion correction to the stereoscopic imagery before merging the stereoscopic imagery and the VR imagery together. For example, the computer system 104/controller 106 may be configured to apply a distortion correction to the VR imagery before the VR imagery is transmitted to the video processing device 200/controller 202, and as a result, the video processing device 200/controller 202 may need to distort the stereoscopic imagery, apply the timewarp correction to the distorted stereoscopic imagery, and then apply a distortion correction to the stereoscopic imagery before merging the stereoscopic imagery with the VR imagery to assemble the MR imagery.

In embodiments, the video processing device 200/controller 202 employs one or more distortion tables including predetermined distortion corrections, and the video processing device 200/controller 202 may be configured to select the distortion correction for the stereoscopic imagery from the one or more distortion tables. For example, the video processing device 200/controller 202 may be configured to select an appropriate distortion correction based on the comparison of the first predicted head pose and the second predicted head pose. In some embodiments, the video processing device 200/controller 202 includes a streaming distortion corrector with a sparse matrix table (SMT)-based coordinate mapping to implement the distortion function, such as the distortion correction described in U.S. patent application Ser. No. 15/060,428, "Low-Power and Low-Latency Distortion Correction for Image Processors," which is incorporated herein by reference, in its entirety. Other distortion corrector architectures with the following properties can also be used provided that the distortion corrector processes the distortion function and outputs pixels in raster row order and implements the distortion function as a coordinate mapping table lookup. Mapping tables (e.g., SMTs) are small enough that many different tables (e.g., 100 or more) may be stored on the embedded hardware (e.g., in the controller 202/memory 204). As disclosed in U.S. patent application Ser. No. 15/060,428, this may be accomplished by using a compression function in the table generation and storage.

Figure 4:
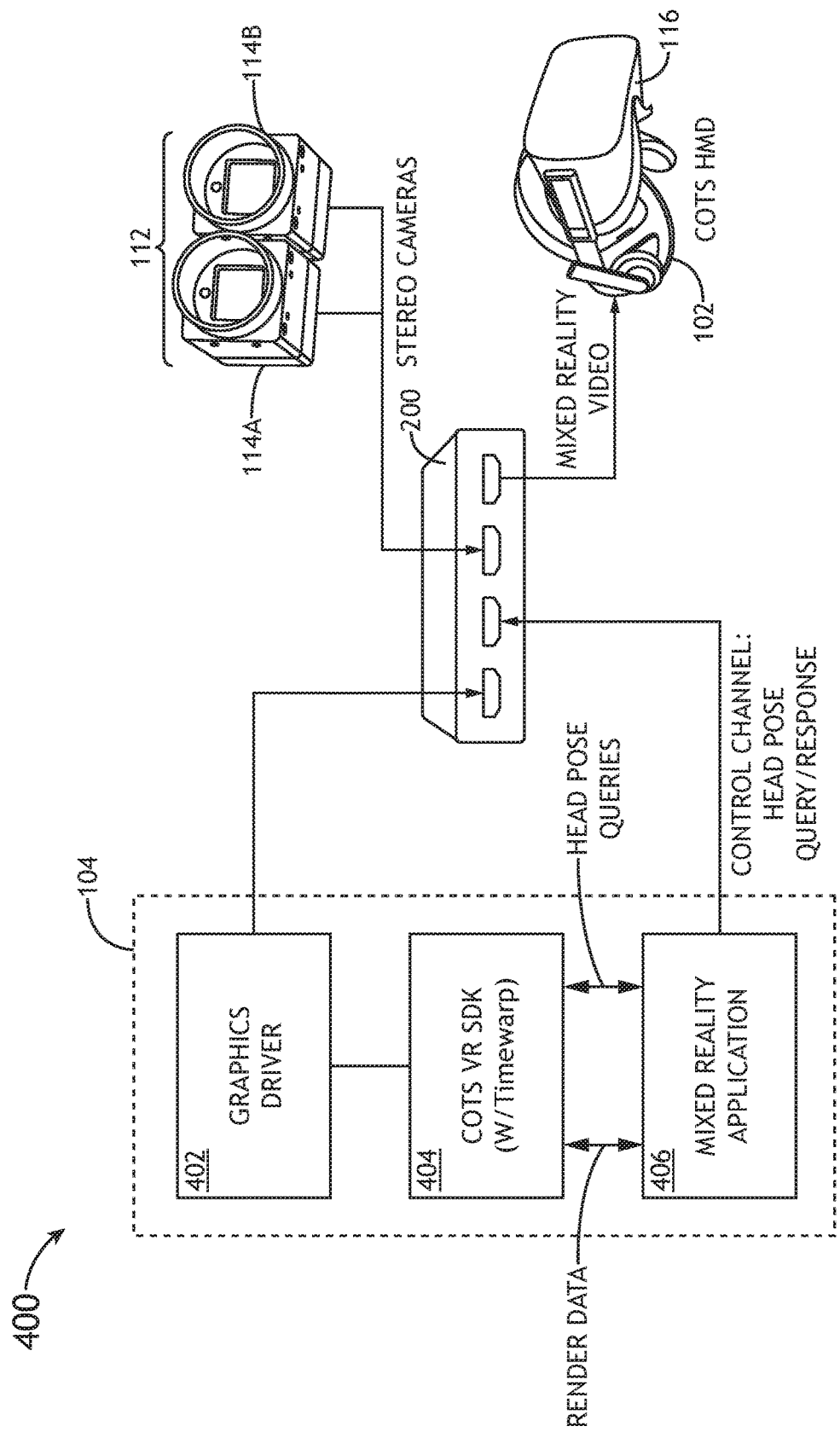
FIG. 4 is another schematic illustration of the mixed reality system that includes the video processing device, in accordance with one or more embodiments of this disclosure.

The video processing device 200/controller 202 architecture allows for VR processing running on a PC (e.g., computer system 104) with GPU acceleration, with motion-tracking capabilities, and an embedded device (e.g., video processing device 200/controller 202) performing timewarp on the real (camera) scene. In embodiments, the video processing device 200/controller 202 can be a bolt-on attachment to a COTS VR system 400, such as the Oculus Rift or HTC Vive, adding the MR capability without any modifications to the COTS VR system 400. As shown in FIG. 4, the VR system 400 may include a graphics driver 402, COTS software development kit (SDK) 404, and MR application 406 running on the computer system 104/controller 106. The MR application 406 may pass head-pose information available by query from the COTS SDK 404 to the video processing device 200/controller 202, allowing the camera timewarp to match the timewarp of the virtual scene, such that both scenes correspond to a single head position as close to display time as possible. As a result, most of the rendering latency is mitigated from the system. In embodiments, the head mounted device 102 may be a COTS VR headset, and wherein the video processing device 200/controller 202 can be configured to communicatively couple to the COTS VR headset (head mounted device 102) and the computer system 104 via a COTS transmission cable (e.g., via HDMI, USB, USB-C, DisplayPort, Thunderbolt, or the like).

Figure 5:
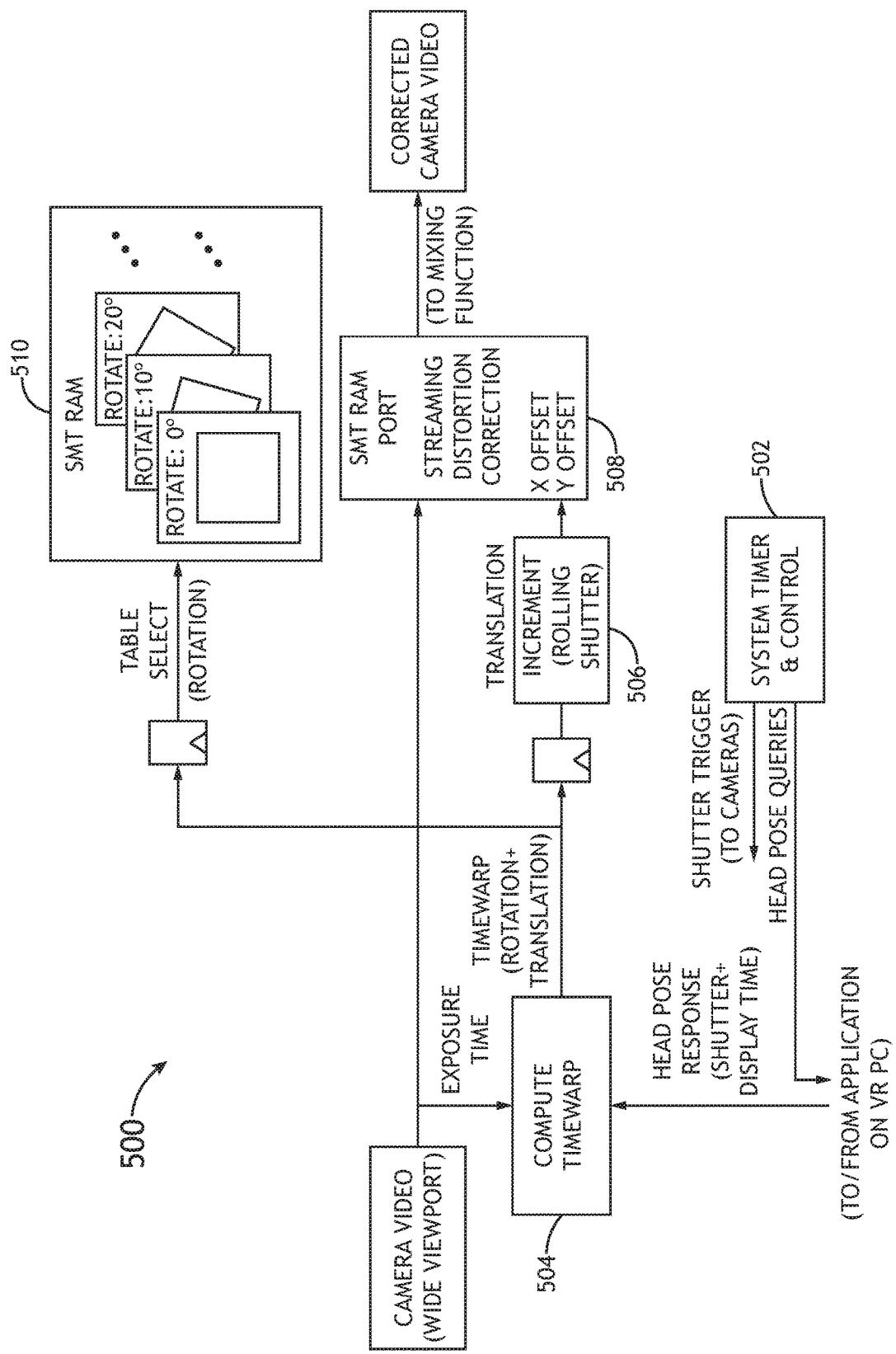
FIG. 5 is a block diagram illustrating logic components of the video processing device, in accordance with one or more embodiments of this disclosure.

A logic diagram 500 illustrating details of the timewarp sequencing and computation are shown in FIG. 5. The logic components and processing shown in FIG. 5 are implemented by the video processing device 200/controller 202. The basic streaming distortion corrector 508 is modified to support timewarp in two ways. Firstly, it adds "X Offset"/"Y Offset" ports, which are updated on a frame-by-frame basis to incorporate the X/Y translational (or "pan") part of the computed timewarp. The distortion corrector 508 simply adds these values to each input coordinate it computes in its lookup function. Additionally, instead of a single distortion table, it includes an addressable set of rotation tables 510, each corresponding to a unique rotational warp. In embodiments, the video processing device 200/controller 202 is configured to apply a rotational correction as part of or in addition to the distortion correction to the stereoscopic imagery. The video processing device 200/controller 202 may include one or more rotation tables 510 including predetermined rotational corrections, where the video processing device 200/controller 202 is configured to select the rotational correction for the stereoscopic imagery from the one or more rotation tables based on a comparison of the first predicted head pose and the second predicted head pose.

The table selection is updated on frame-by-frame basis to select the rotational warp that most closely matches the change in head pose. Decomposing the timewarp into independent translation and rotation elements helps to significantly reduce the number of distortion tables required. While the simple illustration in the figure suggests that only course-grained increments in roll are corrected by the different tables, in reality distortion tables can be created for any combination of rotational distortions (pitch and yaw, too). The granularity is limited only by the RAM required to store all the tables. The baseline distortion corrector has small tables thanks to compression (~24 KB), and the tables are well-suited to SDRAM access due to their burst-oriented access, so it should be possible to support a large number of tables. Also note that this same distortion corrector can simultaneously correct for lens and other distortions in the system—the lens distortion is simply incorporated into each of the timewarp distortion tables. Thus, the timewarp function does not add any processing latency to the system, and adds minimal logic resources besides the additional RAM needed for table storage.

Figure 6A:
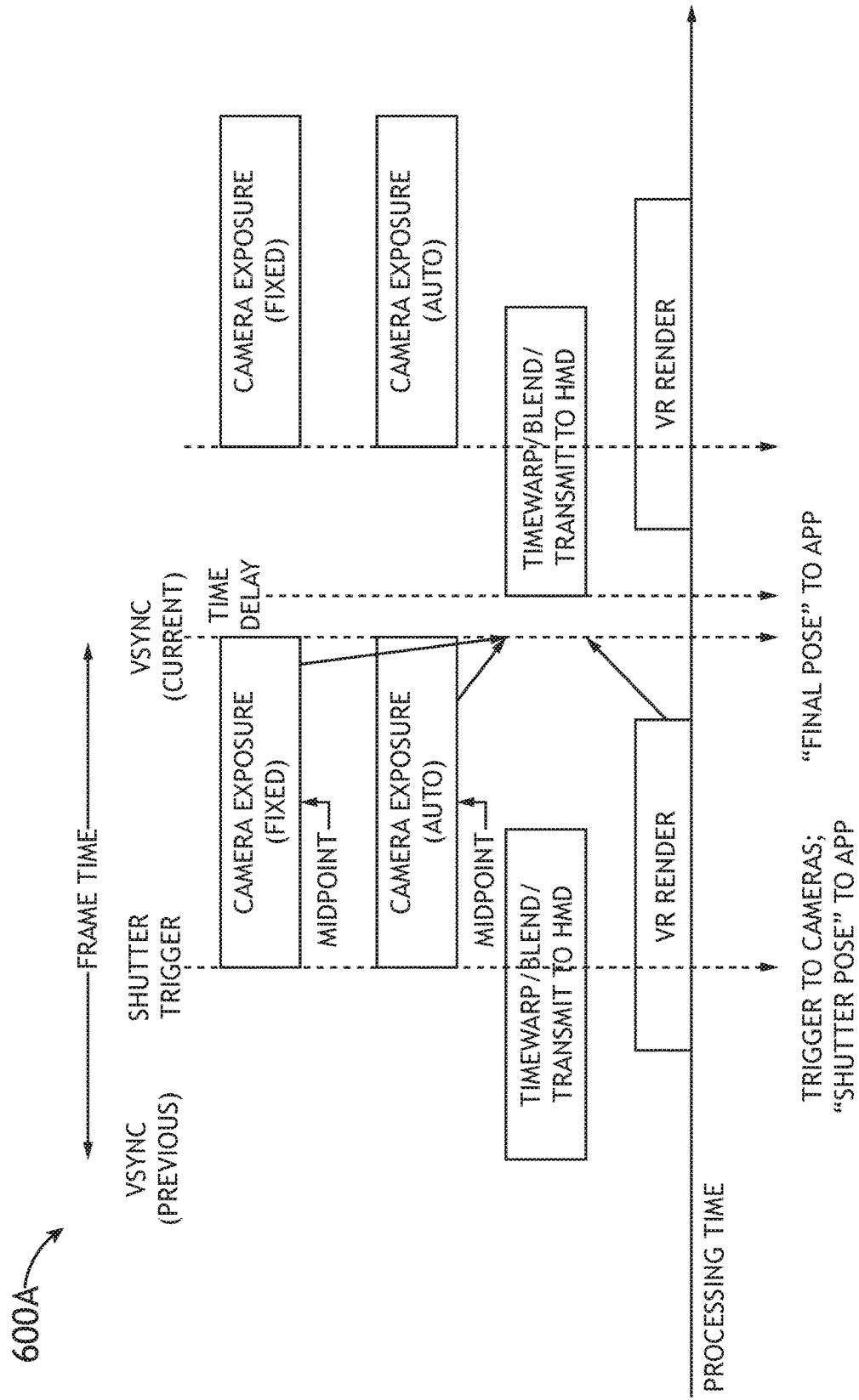
FIG. 6A illustrates system timing of the video processing device, for global shutter configuration, in accordance with one or more embodiments of this disclosure.

In addition to the modified distortion correction, there are two other functions for the timewarp function. The System Timer & Control function 502 generates the cadence of the output video timing—VSYNC, camera shutter, etc. This function also queries the application software for head pose information, both when the camera shutters are triggered, and when it is about to start transmitting to the HMD. The final head pose provided by application software is the same head pose used to warp the VR imagery. This information is passed to the Compute Timewarp function 504, which computes a warp based on the difference between the two (e.g., first and second) head poses. Here, previous pose estimates may be used to refine the current pose estimate, for example, by calculating the direction and speed of motion of the head to better estimate where it will be when the MR imagery is presented via the HMD. In embodiments, the Compute Timewarp function 504 uses the midpoint of the exposure time in its calculation, not the start of exposure, as this provides the least mean-squared error in estimation. This is easily computed if the cameras have a fixed shutter time; however the solution can also be adapted to systems with auto-exposure, if the camera includes the exposure time in the header for each image frame. The Compute Timewarp function 504 simply computes the midpoint based on the reported exposure time in this case. The system timing 600A for these head pose queries is shown in FIG. 6A, assuming the use of a global shutter. It is noted that, depending on camera exposure duration and amount of time required to transfer captured images, the start of camera exposure start may be scheduled either before or after VR render begins. For example, with an 8 ms exposure plus 8 ms of transfer time, vs a 7 ms VR render duration, the start of the camera exposure may be schedule to begin before the VR render begins. In systems that use a rolling shutter, the start of the camera exposure is more likely to begin around or after VR render begins.

Figure 6B:
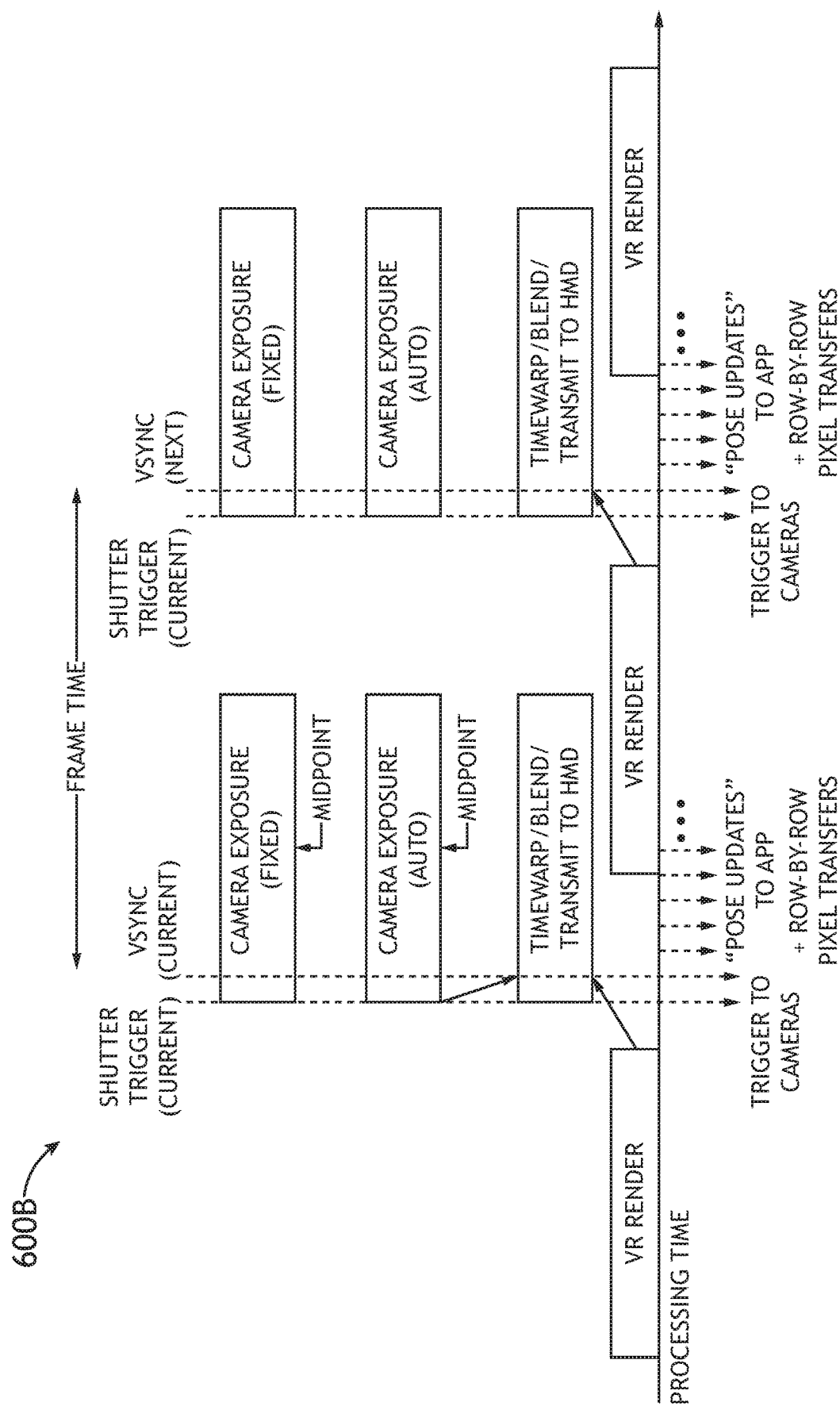
FIG. 6B illustrates system timing of the video processing device, for rolling shutter configuration, in accordance with one or more embodiments of this disclosure.

In embodiments, the system may be adapted for rolling shutter operation of cameras instead of global shutter. Under a rolling shutter, the shutter remains open for a longer total time, but the integration time for each row of the image is staggered. Correspondingly, the image data for each row can be output in the same staggered order, almost immediately after capture. This provides the minimum possible camera latency. The challenge of this approach is that it introduces the possibility of motion tearing in the camera image, since each row is captured at an incrementally later time. The timewarp function described herein may help to correct out tearing due to horizontal motion. In this case, the X Offset input to the distortion corrector is actually updated for every row, to represent the unique head pose for that row. This requires a continual update of the head pose throughout the shutter time. The system may not be able to keep up with head pose query/response at every row; instead, the system may periodically poll the head pose, and then perform interpolation on a row-by-row basis to estimate the current X Offset. In this regard, the video processing device 200/controller 202 may be configured to determine updated head position and orientation predictions during the shutter period and apply a distortion correction for each row of pixels in the stereoscopic imagery based on the updated head position and orientation predictions determined during the shutter period. This row-by-row update of the head pose is represented by the Increment function 506 shown in FIG. 5., and the updated system timing 600B for rolling shutter operation is illustrated in FIG. 6B.

A system that employs remote (e.g., cloud) rendering for a simulator is also disclosed herein. A key problem with cloud rendering is latency. Enough information to describe what is needed to render the desired image must be sent from the client to the server, the image must be rendered, then the rendered image must be compressed, typically using MPEG compression algorithms. The compressed image must be sent back over the network to the client, and the received video stream must be decoded back into an image for display. Each of these steps adds latency. For applications, such as flight simulators, latency of the visual system is a critical measure of performance. The disclosed system employs a timewarp correction to account for the latency associated with cloud rendering.

In embodiments of the disclosed system, the client (e.g., a simulator) sends render commands to the server to describe a scene. Part of these commands is a unique frame identifier, for example, a number or a timestamp. The client commands may also include, but are not limited to: user movements of a joystick, button presses, and/or other user control events; simulated actions of other objects in a scene; etc. These inputs help to dictate: a) the position and orientation of objects in the scene, and b) the viewpoint from which to render the scene. Depending on the simulator architecture, some of these values may be computed at the server instead of the client, so they wouldn't need to be communicated from client to server; for example, some simulators might do all of the behavioral simulation and movement of other objects in the cloud, instead of at the client. When the server sends video imagery (e.g., an MPEG video stream frame) to the client, the server tags the stream frame with the same frame identifier. When the client receives the frame and identifier, the client can use the combination of the past position data associated with the frame identifier and the actual current position at the time the rendered frame is received to determine how much difference there is between the positional state that was sent to generate the frame and the positional state that is most recently known (this latter information arrived while the frame was being sent, rendered, processed, and received.) Given the difference between the two, the client may perform a last-second 2D transform (e.g., pan, rotate, and/or skew) on the output image to correct out this difference. In particular, rotational differences are easy to compensate out and are the most visible and distracting when latency is present.

FIG. 7 illustrates an embodiment of a system 700 including a remote server 710 and a simulator/client device 702 in communication with the remote server 710. The simulator/client device 702 may be a flight simulator or any other type of simulator (another type of vehicle simulator, an environmental simulator, etc.) that employs video imagery (e.g., synthetic video footage, pre-recorded video footage, real-time or near real-time video footage, or the like) to simulate a user experience. In this regard, the simulator/client device 702 includes at least one display 704 (e.g., a LCD, LED display, OLED display, heads-up display, projector, head mounted device/display (HMD), or the like) for presenting the video imagery to the user. In some embodiments, the simulator/client device 702 may further include additional output devices (e.g., speakers, haptic devices (e.g., actuators for simulating motion and/or vibration), fluid systems (e.g., water or air flow systems for simulating moisture, wind, and/or smells), etc.). The simulator/client device 702 may also include one or more input devices (e.g., joystick, steering wheel, buttons, switches, levers, keyboard, keypad, camera or other tracking/proximity sensor (e.g., for tracking user motions, facial recognition, expression detection, and/or gesture detection), etc.).

The simulator/client device 702 also includes at least one controller 706 communicatively coupled to the display 704. The controller 706 provides processing functionality for at least the simulator/client device 702 and can include any number of processors, micro-controllers, circuitry, field programmable gate array (FPGA) or other processing systems, and resident or external memory for storing data, executable code, and other information accessed or generated by the simulator/client device 702. The controller 706 can execute one or more software programs embodied in a non-transitory computer readable medium (e.g., memory) that implement techniques described herein. The controller 706 is not limited by the materials from which it is formed or the processing mechanisms employed therein and, as such, can be implemented via semiconductor(s) and/or transistors (e.g., using electronic integrated circuit (IC) components), and so forth. The controller 706 may include or may be coupled with associated memory and a communication interface (e.g., like controller 106).

The simulator/client device 702 may further include at least one sensor 708 for detecting pose (e.g., vehicle pose and/or head pose). In embodiments, the sensor (or sensors) 708 may include an accelerometer, a gyroscope, an inertial measurement unit (IMU), any combination thereof, or the like. In some embodiments, the sensor (or sensors) 708 may include one or more optical sensors and/or RF sensors configured to detect vehicle/head position and/or orientation based on signals received from a plurality of light or RF sources (e.g., based upon a triangulation scheme). The simulator/client device can also (or alternatively) be configured to detect pose based on user inputs (e.g., via one or more joysticks, buttons, keypads, touch screen, touch panel, touchpad, switches, dials, knobs, cameras, proximity sensors, gesture detectors, microphones, etc.). In some embodiments, if the display is part of a HMD, the simulator/client device 702 may include one or more sensors 708 configured to report vehicle pose, and the HMD may include or may be communicatively coupled with one or more sensors 708 configured to report head pose. In other embodiments, where no HMDs are employed, the system 700 may be configured to rely on vehicle pose without any measurement of head pose.

The controller 706 may be configured to determine a first pose and transmit the first pose to the remote server 710. In some embodiments, the first pose is detected by sensor 708. For example, the controller 706 may be configured to receive a pose measurement from the sensor 708 before transmitting instructions that cause the remote server 710 to render video imagery. In other embodiments, the first pose is based on one or more poses detected by the sensor 708. For example, the controller 706 may be configured to predict a pose at a selected time (e.g., time at which the rendered video is presented via display 704) based on a current pose and an anticipated movement. The first pose can also be calculated based on a plurality of detected poses over time. For example, the controller 706 may be configured to predict a pose at a selected time based on a number of previously detected poses over time (e.g., based on a number of pose measurements indicating a head/vehicle movement and/or rotation and speed of the head/vehicle movement and/or rotation).

The remote server 710 may include one or more controllers/processors configured to render video imagery (e.g., synthetic video footage, pre-recorded video footage, real-time or near real-time video footage, or the like) for the simulator based on instructions received from the controller 706. In some embodiments, the remote server 710 is a cloud or cloud-based server.

The remote server 710 may be configured to receive the first pose from the simulator/client device 702/controller 706. The remote server 710 may be further configured to render video imagery based on the first pose. In this regard, the video imagery rendered by the remote server 710 may include a first timewarp correction based on the first pose.

The remote server 710 is configured to transmit the rendered video imagery to the simulator/client device 702/controller 706. In some embodiments, the remote server 710 is configured to compress the rendered video imagery (e.g., into MPEG format, or the like) and transmit the compressed video imagery to the simulator/client device 702/controller 706.

The remote server 710 may be further configured to send the first pose (i.e., the vehicle and/or head pose associated with the rendered video imagery) to the simulator/client device 702/controller 706 with the rendered and/or compressed video imagery. For example, the remote server 710 may be configured to tag the video imagery with the first pose.

The controller 706 may be further configured to receive video imagery rendered by the remote server 710. In some embodiments, the controller 706 also receives the first pose (i.e., the vehicle and/or head pose associated with the rendered video imagery) with the rendered and/or compressed video imagery. For example, the video imagery may be tagged with the first pose. In other embodiments, the controller 706 may be configured to use a frame tag associated with the video imagery to look up the first pose, based on having maintained a history of recently sent poses (e.g., indexed by frame number).

The controller 706 may be further configured to determine a second pose. In some embodiments, the second pose is detected by sensor 708. For example, the controller 706 may be configured to receive a pose measurement from the sensor 708 just before, at the same time as, or right after receiving the video imagery from the remote server 710. In other embodiments, the second pose is based on one or more poses detected by the sensor 708. For example, the controller 706 may be configured to predict a pose at a selected time (e.g., time at which the rendered video is presented via display 704) based on a current pose and an anticipated vehicle/head movement. The second pose can also be calculated based on a plurality of detected poses over time. For example, the controller 706 may be configured to predict a pose at a selected time based on a number of previously detected poses over time (e.g., based on a number of vehicle and/or head pose measurements indicating a vehicle and/or head movement and/or rotation and speed of the vehicle and/or head movement and/or rotation).

The controller 706 may be further configured to compare the first pose to the second pose. For example, the controller 706 may be configured to determine a difference between the first pose and the second pose. After performing said comparison, the controller 706 may be configured to apply a timewarp correction to the video imagery based on the comparison of the first pose and the second pose. For example, the controller 706 can be configured to shift and/or rotate the video imagery based on the difference between the first pose and the second pose.

As a further enhancement, at the time the controller 706 issues render commands to the remote server 710 to describe the scene, the controller 706 may be further configured to extrapolate motion of the camera and objects in the scene to determine their expected positions at the time of display. In embodiments, controller 706 may be configured to perform this extrapolation based on information about expected round trip timing. This may help reduce the amount of timewarp correction necessary. Instead of compensating out the motion that occurs while remote rendering is happening, in this case, only unexpected motion would need to be compensated.

It is to be understood that implementations of the methods disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims.

Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:
1. A mixed reality system, comprising:
a head mounted device including a display and a stereoscopic camera system; and
one or more controllers communicatively coupled to the head mounted device and configured to:
determine a first predicted head pose corresponding to a time that virtual reality imagery is rendered by the one or more controllers;
determine a second predicted head pose corresponding to a selected point in time during a camera shutter period for detecting stereoscopic imagery via the stereoscopic camera system;
combine the virtual reality imagery with the stereoscopic imagery detected by the stereoscopic camera system during the camera shutter period at least in part by positioning a selected portion of the stereoscopic imagery relative to a selected portion of the virtual reality imagery based on the first predicted head pose and the second predicted head pose;
apply a rotational correction to the stereoscopic imagery, the one or more controllers include one or more rotation tables including predetermined rotational corrections, and apply the rotational correction includes select the rotational correction for the stereoscopic imagery from the one or more rotation tables based on a comparison of the first predicted head pose and the second predicted head pose;

merge the stereoscopic imagery and the virtual reality imagery together; and apply a distortion correction after the merge of the stereoscopic imagery and the virtual reality imagery together.

2. The mixed reality system of claim 1, further comprising at least one sensor for measuring head position and orientation, and wherein the one or more controllers are configured to determine at least one of the first predicted head pose or the second predicted head pose based on measured head position and orientation.

3. The mixed reality system of claim 2, wherein the at least one sensor comprises at least one of an accelerometer, a gyroscope, an inertial measurement unit (IMU), a radio frequency (RF) sensor, or an optical sensor.

4. The mixed reality system of claim 1, wherein the one or more controllers are configured to determine the selected point in time by computing a center of the camera shutter period, and wherein the one or more controllers are configured to determine the second predicted head pose based on a detected head position and orientation at a selected point in time during the camera shutter period and a time difference between the selected point in time and the center of the camera shutter period.

5. The mixed reality system of claim 1, wherein the one or more controllers comprise at least one controller of a computer system communicatively coupled to the head mounted device.

6. The mixed reality system of claim 5, wherein the computer system is configured to:
render the virtual reality imagery.

7. The mixed reality system of claim 6, wherein the computer system is further configured to:
associate the second predicted head pose with the stereoscopic imagery detected by the stereoscopic camera system;
compare the first predicted head pose and the second predicted head pose; and
apply a timewarp correction to at least one of the stereoscopic imagery or the virtual reality imagery based on the comparison of the first predicted head pose and the second predicted head pose.

8. The mixed reality system of claim 6, wherein the one or more controllers further comprise at least one controller of a video processing device communicatively coupled to the head mounted device and to the computer system.

9. The mixed reality system of claim 8, wherein the video processing device is configured to:
receive the virtual reality imagery and the first predicted head pose from the computer system;
determine the second predicted head pose; and
associate the second predicted head pose with the stereoscopic imagery detected by the stereoscopic camera system;
compare the first predicted head pose and the second predicted head pose;
apply a timewarp correction to at least one of the stereoscopic imagery or the virtual reality imagery based on the comparison of the first predicted head pose and the second predicted head pose.

10. The mixed reality system of claim 9, wherein the video processing device is further configured to apply a distortion correction to the stereoscopic imagery before merging the stereoscopic imagery and the virtual reality imagery together.

11. The mixed reality system of claim 10, wherein the video processing device includes one or more distortion tables including predetermined distortion corrections, and wherein the video processing device is configured to select the distortion correction for the stereoscopic imagery from the one or more distortion tables based on the comparison of the first predicted head pose and the second predicted head pose.

12. The mixed reality system of claim 9, wherein the video processing device is configured for a global shutter.

13. The mixed reality system of claim 9, wherein the video processing device is configured for a rolling shutter, and wherein the video processing device is configured to:
determine updated head position and orientation predictions during the shutter period; and
apply a distortion correction for each row of pixels in the stereoscopic imagery based on the updated head position and orientation predictions determined during the shutter period.

14. The mixed reality system of claim 9, wherein the head mounted device comprises a commercial off-the-shelf (COTS) virtual reality headset, and wherein the video processing device is configured to communicatively couple to the COTS virtual reality headset and the computer system via a COTS transmission cable.

* * * * *